United States Patent [19]
Frutschi

[11] Patent Number: 5,386,685
[45] Date of Patent: Feb. 7, 1995

[54] METHOD AND APPARATUS FOR A COMBINED CYCLE POWER PLANT

[75] Inventor: Hans U. Frutschi, Riniken, Switzerland

[73] Assignee: Asea Brown Boveri Ltd., Baden, Switzerland

[21] Appl. No.: 147,531

[22] Filed: Nov. 5, 1993

[30] Foreign Application Priority Data

Nov. 7, 1992 [DE] Germany ............................ 4237665

[51] Int. Cl.⁶ .............................................. F02C 6/18
[52] U.S. Cl. .............................. 60/39.02; 60/39.182; 60/728
[58] Field of Search .............. 60/39.02, 39.182, 726, 60/728, 122.7 R

[56] References Cited

U.S. PATENT DOCUMENTS

| | | | |
|---|---|---|---|
| 3,335,565 | 8/1967 | Aguet | 60/39.182 |
| 4,261,166 | 4/1981 | Mayhofer | 60/39.182 |
| 4,720,968 | 1/1988 | Knizia | 60/39.182 |
| 4,896,499 | 1/1990 | Rice | |

FOREIGN PATENT DOCUMENTS

| | | |
|---|---|---|
| 2731097 | 12/1978 | Germany. |
| 4137946A1 | 5/1993 | Germany. |
| 2153912A | 8/1985 | United Kingdom. |
| 1195020 | 11/1985 | U.S.S.R. |

*Primary Examiner*—Louis J. Casaregola
*Attorney, Agent, or Firm*—Burns, Doane, Swecker & Mathis

[57] ABSTRACT

A method and apparatus for a combined turbine installation includes a gas turbine group with a compressor having a water cooler, a combustion chamber and a gas turbine, and having a steam turbine installation with a waste heat boiler heated by the exhaust gas from the gas turbine. The waste heat boiler includes an evaporator, drum, enconomizer and superheater, a steam turbine downstream of the waste heat boiler and a combined feed water tank/flash evaporator unit. The feed water tank/flash evaporator is supplied with condensate from a condenser fitted downstream of the steam turbine. Cooling water heated by the compressed air is evaporated in at least one state and the steam produced is fed to the waste heat boiler for further heating, or directly to the steam turbine. In addition, the unevaporated residual water is fed to the feed water tank/flash evaporation unit, and after mixing with the condensate from the steam turbine, is supplied to the compressor cooler.

9 Claims, 1 Drawing Sheet

METHOD AND APPARATUS FOR A COMBINED CYCLE POWER PLANT

BACKGROUND OF THE INVENTION

1. Field of the Invention

The invention relates to a method of operating a combined installation formed from a gas turbine group and a steam turbine installation, and an appliance for carrying out the method.

2. Discussion of Background

It is generally known that the combustion air required in the gas turbine process is provided by compressors. Part of the compressor air is frequently branched off in order to contribute to the cooling of the gas turbine blading.

The latter, however, is only possible if the compressor air is brought to a sufficiently low temperature because otherwise the cooling becomes questionable. In addition, high combustion air temperatures lead to difficulties in the maintenance of low oxides of nitrogen figures ($NO_x$) in the exhaust gas of the gas turbine.

Particularly in the case of modern high-power gas turbines, high combustion air compression ratios are necessary, i.e. it is necessary to supply particularly strongly compressed combustion air, and this has disadvantageous effects in the sense previously described.

Although it is already known art to reduce the temperature level of the compressed combustion air by cooling in one or, if need be, in a plurality of coolers—as a remedy for the problems mentioned above—the extraction of heat from the combustion air taking place in this case is unfavorable with respect to the efficiency of combined installations and can therefore hardly be recommended if, at the same time, the heat energy extracted is not utilized.

SUMMARY OF THE INVENTION

Accordingly, one object of this invention is to improve a method of the type mentioned at the beginning in such a way that adequate cooling of the combustion air is achieved and, at the same time, the heat energy obtained during the cooling of the combustion air is further used in the process itself. An appliance for carrying out the method is also provided.

This object is achieved by providing for the cooling water heated by the waste heat of the compressed combustion air to be evaporated in at least one stage. The steam formed by this process is fed to the steam turbine, whereas the unevaporated residual water is fed to the combined feed water tank and flash evaporator unit associated with the steam turbine installation and, after mixing with the condensate supplied from the condenser fitted downstream of the steam turbine, is used for feeding the cooler.

An expedient further development of the invention provides that the water evaporated in a first stage partially evaporates and that the steam formed by this process is superheated before it is fed to the steam turbine.

In accordance with a preferred embodiment of the invention, the unevaporated residual water is evaporated in the combined feed water tank and flash evaporator unit and the steam formed process is likewise fed to the steam turbine.

A preferred embodiment of the invention provides for the heated cooling water to be spontaneously expanded in at least one so-called flash evaporator, for the steam formed by this process to be fed to the waste heat boiler and for the unevaporated residual water to be fed to the combined feed water tank and flash evaporator unit.

A solution to the basic object in terms of apparatus—in the form of an appliance for carrying out the method according to the invention—is given, according to the invention.

Providing for the water-side outlet of the cooler to be connected to at least one evaporation vessel which is in turn connected, directly or indirectly, to the steam turbine and to the combined feed water tank and flash evaporator unit.

It is then an advantage for an evaporation vessel to be the drum belonging to the waste heat boiler.

In accordance with a preferred embodiment of the appliance according to the invention, a so-called flash evaporator is provided as the evaporation vessel. This permits spontaneous evaporation of the heated cooling water, which is at a pressure higher than that present in the flash evaporator.

In a further improvement to this embodiment, a plurality of evaporation vessels can be connected in series. Each succeeding evaporation vessel is matched to the respectively previous evaporation vessel with respect to pressure and temperature. This makes it possible to achieve optimum use of the residual heat of the cooling water heated by the waste heat of the compressor.

These and further advantageous embodiments of the invention are the subject-matter of the subclaims.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DESCRIPTION OF THE PREFERRED EMBODIMENTS

Figure 1:
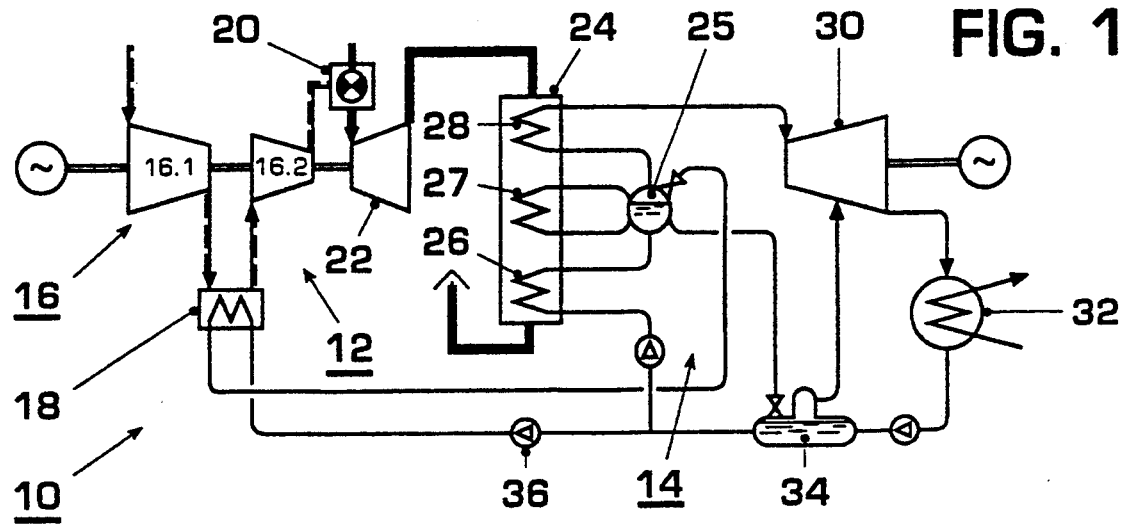
FIG. 1 shows a circuit diagram of a first combined installation according to the invention with superheating of the evaporated cooling water.

Referring now to the drawings, wherein like reference numerals designate identical or corresponding parts throughout the several views, FIG. 1 shows the circuit diagram of a combined installation 10 with a gas turbine group 12 and a steam turbine installation 14.

The gas turbine group 12 has a two-part compressor 16 with a cooler 18, arranged between the two compressor parts 16.1 and 16.2, a combustion chamber 20 and a gas turbine 22.

The steam turbine installation 14 includes a waste heat boiler 24 (which is heated by the exhaust gas of the gas turbine 22 and in which are integrated a drum 25, an economizer 26, an evaporator 27 and a superheater 28), a downstream steam turbine 30, a condenser 32 connected to the latter and a combined feed water tank and flash evaporator unit 34 connected to the condenser 32.

The cooler 18, which is of particular interest in the present case, is configured as an air/water cooler and is connected, at its inlet end, to the combined feed water tank and flash evaporator unit with a pressure-increasing pump 36 connected between for the purpose of providing preheated, pressurized water as the cooling water.

The outlet of the cooler 18 is connected to the drum 25 which, in turn, is in connection with the economizer 26 and the evaporator 27 and also with the superheater 28.

In accordance with the mode of operation to suit the circuit of the arrangement 10 shown, the cooling water is heated, because of the compression work in the compressor 16, to a temperature level which is higher than the temperature of the drum 25 in which the steam coming from the evaporator 27 is collected. In consequence, the heated cooling water supplied to the drum 25 partially evaporates. The steam formed by this process flows to the superheater 28 and finally reaches the steam turbine, to which it is admitted as a driving medium.

The unevaporated residual water is fed from the drum 25 to the combined feed water tank and flash evaporator unit 34 where further partial evaporation takes place because the combined feed water tank and flash evaporator unit 34 supplied with condensate is also at a lower temperature level than the residual water flowing in. The steam formed during this evaporation is supplied directly to the steam turbine 30 and, by this means, contributes to utilization of the residual heat energy.

Figure 2:
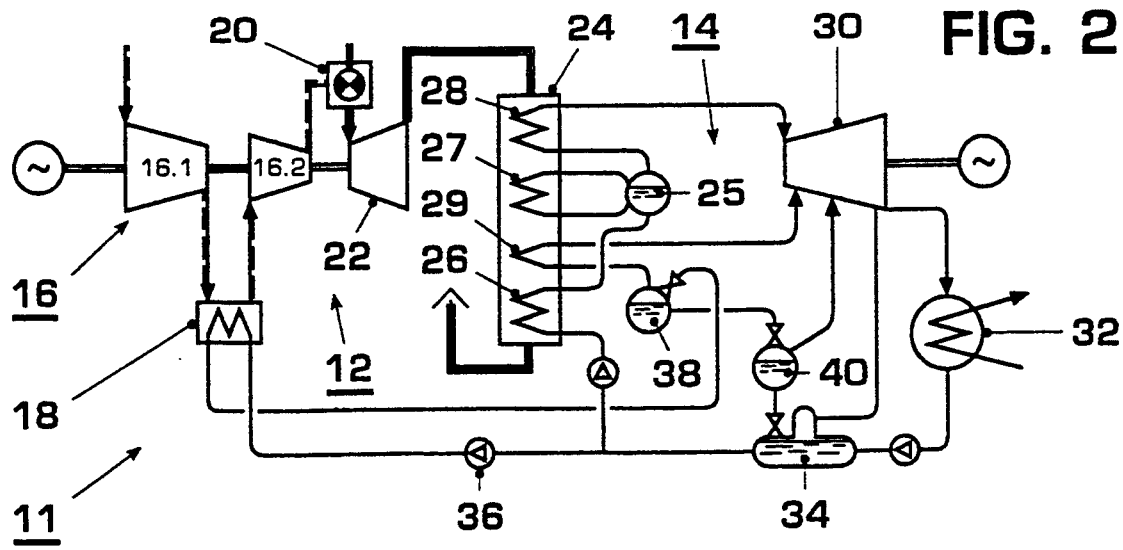
FIG. 2 shows a circuit diagram of a second combined installation according to the invention with evaporation to an optimum pressure level in a flash evaporator.

The arrangement shown by the circuit diagram in FIG. 2 likewise relates to a combined installation 11, the circuit diagram shown corresponding in numerous features to the circuit diagram shown in FIG. 1 so that the corresponding reference numbers have been used in each case for the features which coincide and for which, therefore, the explanations given with respect to FIG. 1 apply.

Relative to the arrangement shown in FIG. 1, however, the circuit in accordance with FIG. 2 has some relevant improvements from the thermodynamic point of view.

Thus, it should first be noted that because of the relatively high pressure level in the drum 25, only a relatively small part of the hot cooling water supplied evaporates. This aspect is countered by providing a separate, first evaporation vessel 38 which is preferably a so-called flash evaporator. The steam occurring during the expansion of the hot residual water in this first evaporation vessel 38 is initially supplied to a superheater 29 and subsequently to the steam turbine 30.

This first evaporation vessel 38 is independent of the process parameters determined by the exhaust gas heating of the waste heat boiler 24 but can, however, be individually matched to the necessary pressure and temperature levels of the cooler 18 or to the process technical data of the heated cooling water. This permits optimum utilization of the waste heat contained in the cooling water.

Pursuing these considerations, a second evaporation vessel 40 is fitted in series with the first and this is likewise designed to suit the residual water flowing in from the first evaporation vessel 38 with respect to pressure and temperature. It is advantageous for the second evaporation vessel 40 to be configured as a flash evaporator, like the first evaporation vessel 38.

The steam generated during the evaporation, in this second evaporation vessel 40, of the residual water fed from the first evaporation vessel 38 is likewise supplied to the steam turbine 30 for further use whereas the unevaporated residual water is fed for residual expansion to the combined feed water tank and flash evaporator unit 34 whose steam dome is likewise connected to the steam turbine 30.

Figure 3:
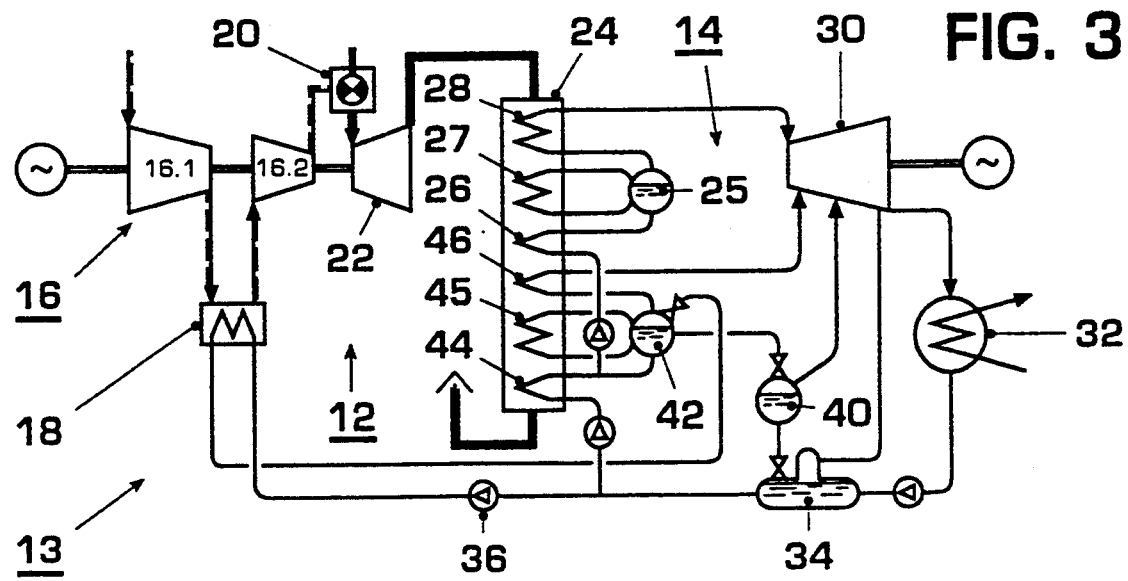
FIG. 3 shows a circuit diagram of a third combined installation according to the invention with a waste heat boiler configured as a two-pressure system.

The circuit arrangement shown in FIG. 3 likewise relates to a combined installation 13 which substantially coincides with the arrangements shown in and explained in FIGS. 1 and 2 respectively, so that the corresponding reference numbers have been used in each case for the coinciding features, for which the explanations given with respect to FIG. 1 and FIG. 2, respectively, apply.

The essential difference relative to the previously explained arrangements 10 and 11 may be seen in the fact that in the present case, the waste heat boiler 24 is embodied as a two-pressure system, a boiler drum 42 being provided as the first evaporation vessel 42 for the hot cooling water in place of a flash evaporator. In addition to effective utilization of the waste heat from the compressor 16, this measure utilizes the waste heat of the chimney gases of the gas turbine 22 in an even better manner in the waste heat boiler 24.

Accordingly, the waste heat boiler 24 has, in addition to the assemblies such as economizer 26, evaporator 27 and superheater 28, provided as the second pressure stage and already shown in FIG. 1, a first pressure stage, again with an economizer 44, an evaporator 45 and a superheater 46, matched to the pressure level of the cooler 18.

The unevaporated residual water in the drum 42 acting as an evaporation vessel is fed to a second evaporation vessel 40 with a lower temperature and a lower pressure so that renewed evaporation takes place, the resulting steam being fed to the steam turbine 30 and the remaining residual water being fed for further expansion to the combined feed water tank and flash evaporator unit 34.

A three-pressure boiler arrangement equipped with three stepped pressure drums, such as is used for the highest quality combined installations, permits finely stepped evaporation of the cooling water with minimum additional design requirements.

What is claimed as new and desired to be secured by Letters Patent of the United States is:

1. A method for operating a combined gas turbine and steam turbine installation, comprising the steps of:
   compressing air for the gas turbine in at least two stages;
   cooling compressed air from a first compressor stage prior to further compression with water in a cooling unit;
   evaporating to steam at least part of the water heated by the compressed air in at least a first stage;
   heating further the steam from the first stage in a waste heat boiler;
   supplying the further heated steam to the steam turbine;
   condensing exhaust steam from a steam turbine;
   collecting the condensed steam in a combined feed water tank and evaporation unit;
   directing heated water not evaporated to steam to the feed water tank and evaporation unit; and,
   supplying water from the feed water tank and evaporation unit to the compressor cooling unit.

2. The method as claimed in claim 1, wherein the water heated by the compressor air is directed to a steam drum integrated with the waste heat boiler as the first stage and therein partially evaporates, and the steam formed in the drum is superheated before it is fed to the steam turbine.

3. The method as claimed in claim 1, wherein residual water not evaporated in the first stage is fed to the combined feed water heater and flash evaporator and there expanded to steam, the steam being fed to the steam turbine at a suitable pressure location.

4. The method as claimed in claim 1, wherein the first stage evaporation comprises feeding the heated cooling water to a flash evaporator for evaporation to steam, further heating the steam formed in the flash evaporator in the waste heat boiler and feeding the heated steam to the turbine, wherein residual water not evaporated in the flash evaporator is fed to the combined feed water tank and flash evaporator.

5. The method as claimed in claim 4, wherein residual water not evaporated in the flash evaporator is fed to a second flash evaporator and therein evaporated to steam, the steam formed in the second flash evaporator being supplied to an intermediated stage of the steam turbine and residual water not evaporated in the second flash evaporator is fed to the combined feed water tank and flash evaporator.

6. A combined gas turbine and steam turbine installation, comprising:
- a gas turbine group having a two stage compressor, a cooler to cool air compressed in a first stage using water, a combustion chamber downstream of the compressor, and a gas turbine downstream of the combustion chamber; and
- a steam turbine group having a waste heat boiler connected to receive exhaust from the gas turbine, the waste heat boiler integrated with an evaporation vessel, the evaporation vessel having at least a superheater integrated with the waste heat boiler, a steam turbine connected downstream of the superheater, a condenser connected to receive and condense exhaust steam from the steam turbine and combined feed water tank and flash evaporator connected downstream of the condenser;
- wherein the combined feed water tank is connected to supply water to the cooler for the compressor, and the cooler is connected to deliver heated water to at least the evaporation vessel to evaporate a quantity of steam from the heated water for the steam turbine.

7. The installation as claimed in claim 6, wherein the evaporation vessel comprising a drum integrated with the waste heat boiler by an economizer connected to receive water from the combined feed water tank and flash evaporator and deliver heated water to the drum, an evaporator to evaporate water from the drum and return steam to the drum and a superheater to heat the steam.

8. The installation as claimed in claim 6, wherein the evaporation vessel comprises at least one flash evaporator connected to receive heated water from the compressor cooler, and further comprising a drum integrated with the waste heat boiler by an economizer connected to receive water from the combined feed water tank and flash evaporator and deliver heated water to the drum, an evaporator to evaporate water from the drum and return steam to the drum and a superheater to heat the steam.

9. The installation as claimed in claim 8, wherein a plurality of evaporation vessels are connected in series, a first of said vessels being integrated with the waste heat boiler by a superheater and wherein each succeeding evaporation vessel is matched to the respectively previous evaporation vessel with respect to pressure and temperature, each of the evaporation vessels being connected to deliver steam to the steam turbine.

* * * * *